(12) United States Patent
Navarro

(10) Patent No.: US 7,168,531 B2
(45) Date of Patent: Jan. 30, 2007

(54) SELF-CONTAINED BRAKE AND REMOTE CONTROL SYSTEM FOR A TRAILER

(76) Inventor: Steve Navarro, 477 Roland Way, Oakland, CA (US) 94621

( * ) Notice: Subject to any disclaimer, the term of this patent is extended or adjusted under 35 U.S.C. 154(b) by 423 days.

(21) Appl. No.: 10/775,653

(22) Filed: Feb. 10, 2004

(65) Prior Publication Data

US 2004/0154878 A1 Aug. 12, 2004

Related U.S. Application Data

(60) Provisional application No. 60/446,502, filed on Feb. 11, 2003.

(51) Int. Cl.
*B60T 7/20* (2006.01)
(52) U.S. Cl. .................. 188/112 R; 188/142; 280/428; 280/446.1
(58) Field of Classification Search ............ 188/112 R, 188/112 A, 142; 280/428, 446.1, 486, 432, 280/112 R
See application file for complete search history.

(56) References Cited

U.S. PATENT DOCUMENTS

| | | | | |
|---|---|---|---|---|
| 4,093,265 A | * | 6/1978 | Hodge | 280/438.1 |
| 4,653,770 A | * | 3/1987 | Pyle | 280/432 |
| 5,013,059 A | * | 5/1991 | Goettker | 280/446.1 |

* cited by examiner

*Primary Examiner*—Xuan Lan Nguyen
(74) *Attorney, Agent, or Firm*—Timothy M. Barlow

(57) ABSTRACT

A self-contained trailer braking system comprises a fifth wheel hitch attached to a trailer frame, where the trailer hitch further comprises a kingpin to engage a fifth wheel of a towing vehicle. A sliding mechanism is attached to the kingpin, where the sliding mechanism is slidingly captured within the trailer frame and can move between a forward position and a rear position. A spring is attached to the sliding mechanism and the trailer frame, where the spring biases the sliding member to the forward position. A brake actuator is mounted to the trailer frame and linked to the sliding mechanism. A brake assembly is attached to the brake actuator, and a power supply is attached to the brake assembly, where power is applied to the brake assembly when the sliding mechanism is away from the forward position.

14 Claims, 5 Drawing Sheets

SELF-CONTAINED BRAKE AND REMOTE CONTROL SYSTEM FOR A TRAILER

PRIORITY

This application claims benefit of U.S. Provisional Patent Application Ser. No. 60/446,502, filed Feb. 11, 2003.

BACKGROUND OF THE INVENTION

1. Field of the Invention

The present invention relates generally to trailer brake and remote control systems for automotive use, and more specifically to a independent brake operating system and remote trailer operating system for automotive trailers.

2. Description of Related Art

Automotive trailers are a common part of our lives. We tow trailers behind virtually every type of vehicle known. We use trailers to carry a wide variety of items and we expect trailers to perform a wide variety of tasks. For the very heaviest of trailers, we rely on the fifth-wheel and pintle hitches. Two very common types of automotive trailers that use the fifth wheel and pintle hitches are heavy equipment trailers used on construction sites, and recreational vehicle trailers.

One type of heavy equipment trailer is a water trailer, also known as a water wagon. A water wagon is used frequently on construction sites. The water trailer is used to distribute water over a work site for such tasks as dust control, soil compaction, street cleaning, irrigation, fire prevention or control, and chemical delivery. In its basic form the water trailer is a large water tank mounted to a trailer frame. The water trailer is attached to a semi tractor to be pulled to or through the area where water is needed. A semi tractor is needed to supply pneumatic power for the water trailer's brakes. If no semi tractor is available, the water trailer cannot operate safely. This places a demand on an equipment fleet to have a dedicated semi tractor and available to operate the water trailer when it is needed. Additionally, a semi tractor driver needs a special driver license. This is wasted on a job site. There is no reason to have an special person at the site just to operate a water trailer.

When no water trailer is available, a water tank is sometimes placed into the bed of a dump truck to serve the same purpose. However, with either of these variations the water flow from the tank is controlled by pneumatics or by a cable. The driver must have compatible equipment in the truck's cab to operate the trailer's water distribution system. Regardless of the type of truck and trailer operations, this arrangement is inefficient.

Thus, what is needed is a trailer that can be remotely operated while the driver or operator is safely in the truck's cab or another safe location.

Some of the most specialized trailers and equipment are found in the construction industry. Often, these trailers are so large that the common American light duty pickup truck is incapable of towing them over the road. These trailers often require the capacity of a semi tractor, or similar towing vehicle. As a result of the trailers' size and weight, special dedicated braking systems and equipment are required to control them over the road.

Operating heavy trailers over the road requires special brake equipment due to Federal and state laws. The heavy equipment and recreational vehicle trailers can often be quite massive and require special, heavy duty coupling and braking systems to properly control the load. However, these legal restrictions may not apply to use of the trailers for off road purposes.

Typical trailer brakes are operated via pneumatic, electric or hydraulic power. In the standard arrangement, the power to operate the braking systems is supplied by the towing vehicle. The braking power, whether pneumatic, electric or hydraulic, is routed to a coupling at the rear of the towing vehicle. When the trailer is attached, the mating coupling from the trailer is attached to the towing vehicle's coupling to operate the trailer brakes and other systems. Such an arrangement requires that the towing vehicle be specially equipped to supply pneumatic, electric or hydraulic power as required by the trailer. As a result, both the trailer and the towing vehicle must be specially outfitted with compatible equipment. The added complexity can create a very expensive situation, especially where a large fleet of towing vehicles is maintained.

With respect to heavy trailers, one of the most common hitch mechanisms is the fifth wheel hitch. Fifth-wheel hitches are used for both commercial and recreational trucks and trailers. The trailer's hitch has a kingpin that protrudes downward from a hitch plate on the front of the trailer. This kingpin is inserted into the fifth wheel at the rear of the towing vehicle.

The towing vehicle's framework supports a fifth wheel hitch, which has a large plate with a mechanism for accepting and locking onto the kingpin from a trailer. Typical fifth wheel hitch components are rigidly mounted to the towing vehicle and the trailer. Once coupled, only a few degrees of movement between the towing vehicle and the trailer is allowed. In one variation of the fifth wheel hitch, the fifth wheel hitch frame of the towing vehicle is designed to rock side to side a few degrees to permit easier coupling where the towing vehicle and the trailer are on particularly uneven surfaces. However, this feature is utilized during coupling or uncoupling operations only. With all these special systems, the trailer hitches, brake and power couplings are built into the towing vehicles to meet the stringent legal requirements for over the road use. As a result, the towing vehicles become very expensive to operate and maintain. This places great demands on the trucks and reduces cost-effectiveness.

Thus, what is needed is a self-contained trailer braking system that requires no special dedicated equipment on the towing vehicle except for a trailer hitch to properly connect the trailer to the towing vehicle.

SUMMARY OF THE INVENTION

The device is a self-contained brake and remote control system for trailer operation. The system allows permits any truck with a trailer hitch to safely pull and stop a trailer without any coupling between the trailer and the towing vehicle except for the trailer hitch. In addition, the system allows the trailer's functions to be operated and controlled from a remote, safe location, such as the cab of the towing vehicle. The system also allows the trailer to be operated safely on a hazardous or unsafe work site by virtually any truck, bulldozer, grader, loader or other equipment with a compatible hitch, regardless of whether the vehicle has a Department of Transportation approved braking system, without risk to the operator or driver. For example, the trailer could be used by military units to pull heavy equipment through combat areas. By default, more towing vehicles, including tanks or other armored vehicles, are available. Other uses include off-road logging trailers or off-road delivery trailers that can be more safely operated with off-road towing vehicles. Additionally, these trailers could be used for fighting forest fires, pulled by proper off-road towing vehicles.

The trailer braking system includes a fifth-wheel trailer hitch, an energy transfer mechanism, a brake actuator, and a power generator all attached to a trailer with brakes. The remote trailer operating system includes a remote control transmitter, a remote control receiver, and power equipment mounted on the trailer and powered by the power generator for the braking system. Thus the trailer may function even if no towing vehicle or other power source is available.

The energy transfer mechanism includes a special hitch plate with a slot oriented fore and aft down through which a kingpin protrudes to engage the towing vehicle's fifth-wheel. The kingpin is fixed to a sliding plate immediately above and in contact with the hitch plate. A linkage is attached between the sliding plate and a brake actuator. The brake actuator is supplied with energy from the generator to operate the trailer's brakes. The brake actuator meters energy to the brakes in response to the position of the sliding plate.

In use, the hitch framework on the towing vehicle and the trailer are subject to a tremendous amount of force and energy due to dynamic trailer loads. The self-contained trailer brake system uses these forces to activate the trailer's braking system, eliminating the dependence on specialized towing vehicles with pneumatic, hydraulic, electric or cable-operated systems. As a result, virtually any vehicle with an appropriate hitch, such as a fifth-wheel or pintle hitch, can be a proper towing vehicle. This increases the flexibility of the truck and equipment owners and increases cost-effectiveness. Trucks having fifth wheels come in a variety of sizes. The trailer is produced in different sizes and scaled to be appropriate for towing vehicles from pickup trucks to the largest construction equipment.

Accordingly, it is a principal object of the invention to teach a trailer braking system that is completely self-contained.

It is another object of the invention to provide a trailer braking system that works with virtually any truck, bulldozer or other heavy equipment.

It is a further object of the invention to teach a trailer control system that may be operated from the cab of a truck, without any permanently installed equipment.

Still another object of the invention is to provide a wirelessly operated trailer control system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a self-contained brake and remote control system. The trailer braking system includes a fifth-wheel trailer hitch, an energy transfer mechanism, a brake actuator, and a power generator all attached to a trailer with brakes. The remote trailer operating system includes a remote control transmitter, a remote control receiver, and a variety of power equipment mounted on the trailer and powered by the power generator.

The energy transfer mechanism includes a special hitch plate with a slot oriented fore and aft down through which a kingpin protrudes to engage the towing vehicle's fifth-wheel. The kingpin is fixed to a sliding plate immediately above and in contact with the hitch plate. A linkage is attached between the sliding plate and a brake actuator. The brake actuator is supplied with energy from the generator to operate the trailer's brakes. The brake actuator meters energy to the brakes in response to the position of the sliding plate. The trailer's brakes may be pneumatic, electric or hydraulically powered.

Figure 1:
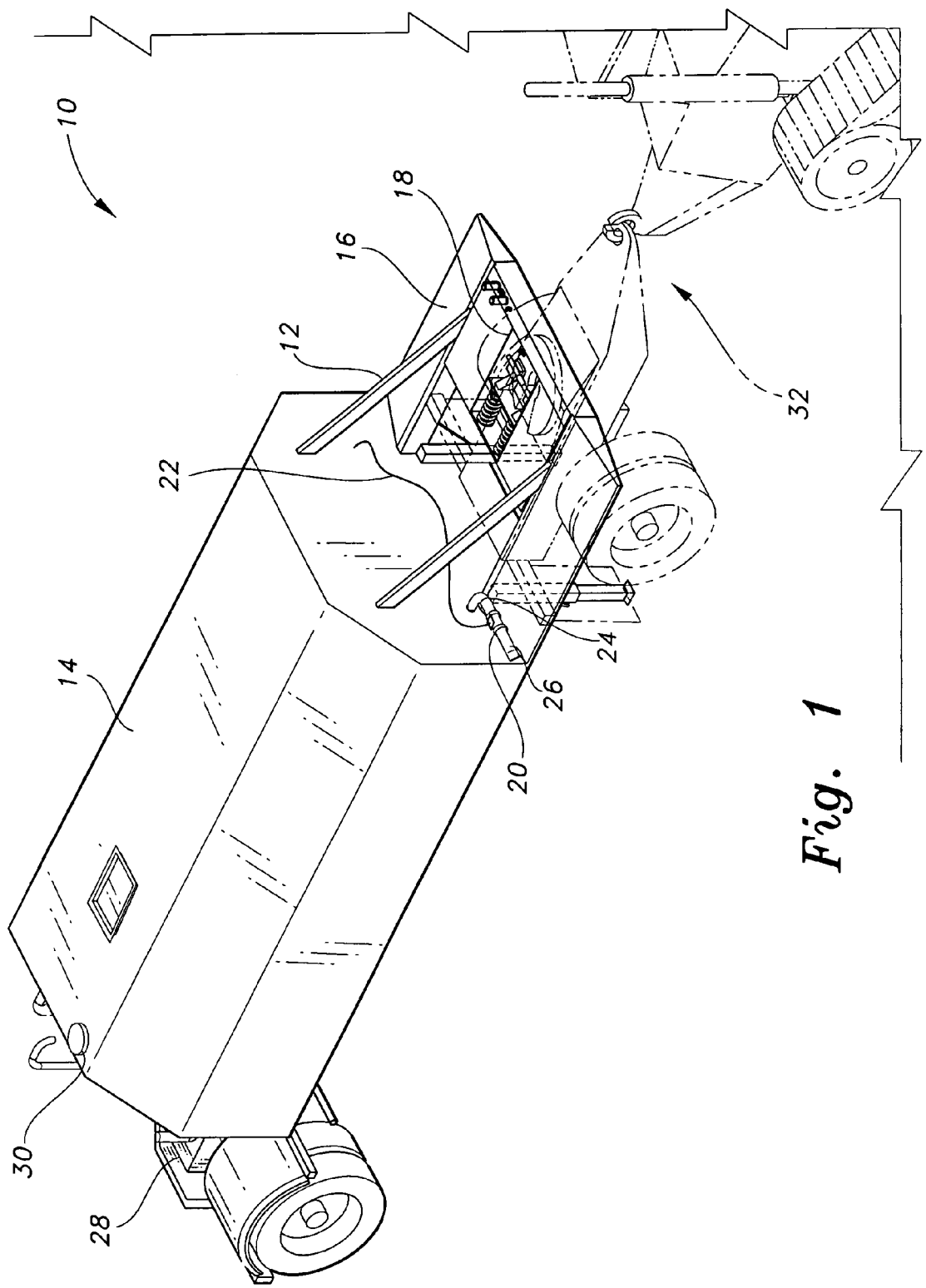
FIG. 1 is a perspective view of a trailer equipped with a self-contained brake and remote control system, according to the present invention.

FIG. 1 is a perspective view of a trailer equipped with a self-contained brake and remote control system, according to the present invention. The trailer 10 resembles a standard trailer in many ways. A high-strength frame 12 runs the whole length of the trailer 10 and supports the load, in this case a water tank 14. A heavy-duty axle at the rear of the trailer 10 supports the tremendous weight of the fully loaded trailer and brakes incorporated into the axle. Two or more axles may be used, and flotation tires as well, to deal with a very heavy trailer or to minimize the impact on the ground surface. A stand is attached near the front of the trailer 10 to keep the trailer level when it is not attached to a towing vehicle. The stand can be raised and lowered via a crank mechanism visible just below the frame 12 ahead of the water tank 14. A forward deck 16 area includes a fifth-wheel hitch 18 (see FIG. 4) as well as standard couplings and controls for pneumatic, electric or hydraulic power (see FIGS. 2 and 3). Other aspects of the trailer 10 are quite unique.

The trailer frame 12 is incorporated into and through the tank 14, providing exceptional support to the tank 14 and protection for the frame 12. The water tank 14 is used to supply water for a multitude of purposes. In this embodiment, virtually all of the plumbing, power conduits and control cables for the trailer 10 is routing through the tank 14, protecting it from damage. A plurality of water couplings 20 are attached in various places around the tank 14 to permit the user to utilize the trailer 10 in the optimum manner. Each coupling 20 may include a power conduit 22 and a control cable 24 to permit the selective use of the any coupling 20 on the trailer 10. A number of power accessories may be attached to the couplings 20, such as a high-pressure water nozzle 26. The couplings 20 are an industry standard size and will accept any number of common power accessories such as water cannons and other spray heads. The power conduit 22 is routed through the tank 14 to a power generator (see FIG. 5) in an engine bay 28 at the rear of the trailer 10.

A fill port 30 is located atop the tank 14 and permits quick and easy filling of the tank 14 from a number of sources, including hydrants, water towers, ground water, ponds and virtually any other water source.

The trailer 10 is shown coupled to a bulldozer and a towing dolly 32, but virtually any towing vehicle capable of supporting the weight of the trailer could be used, including rubber-tire loaders, earth movers, semi tractors and many other vehicles. In this embodiment, the bulldozer does not have a fifth wheel, but does have a pintle hitch instead. A towing dolly 32 is used to attach the trailer to the towing vehicle. The towing dolly 32 has a fifth-wheel which couples directly to the fifth-wheel hitch 18 on the trailer 10. In another embodiment, the towing vehicle has a fifth wheel, such as a semi tractor. The typical dolly has an axle, or tandem axles, with one or more wheels at each end, similar to the axle on the trailer 10. It has a ring or other compatible mechanism for coupling with the towing vehicle's pintle. Atop the axle is a fifth wheel, similar to that found on the semi tractor. Virtually every piece of heavy equipment found on construction sites has a pintle hitch. In this manner, the trailer 10 may be towed and operated on a job site even if no semi tractor is available. This greatly improves the flexibility of a work crew and, manager of a job site who can choose an available towing vehicle from a large number of available pieces of equipment.

Figure 2:
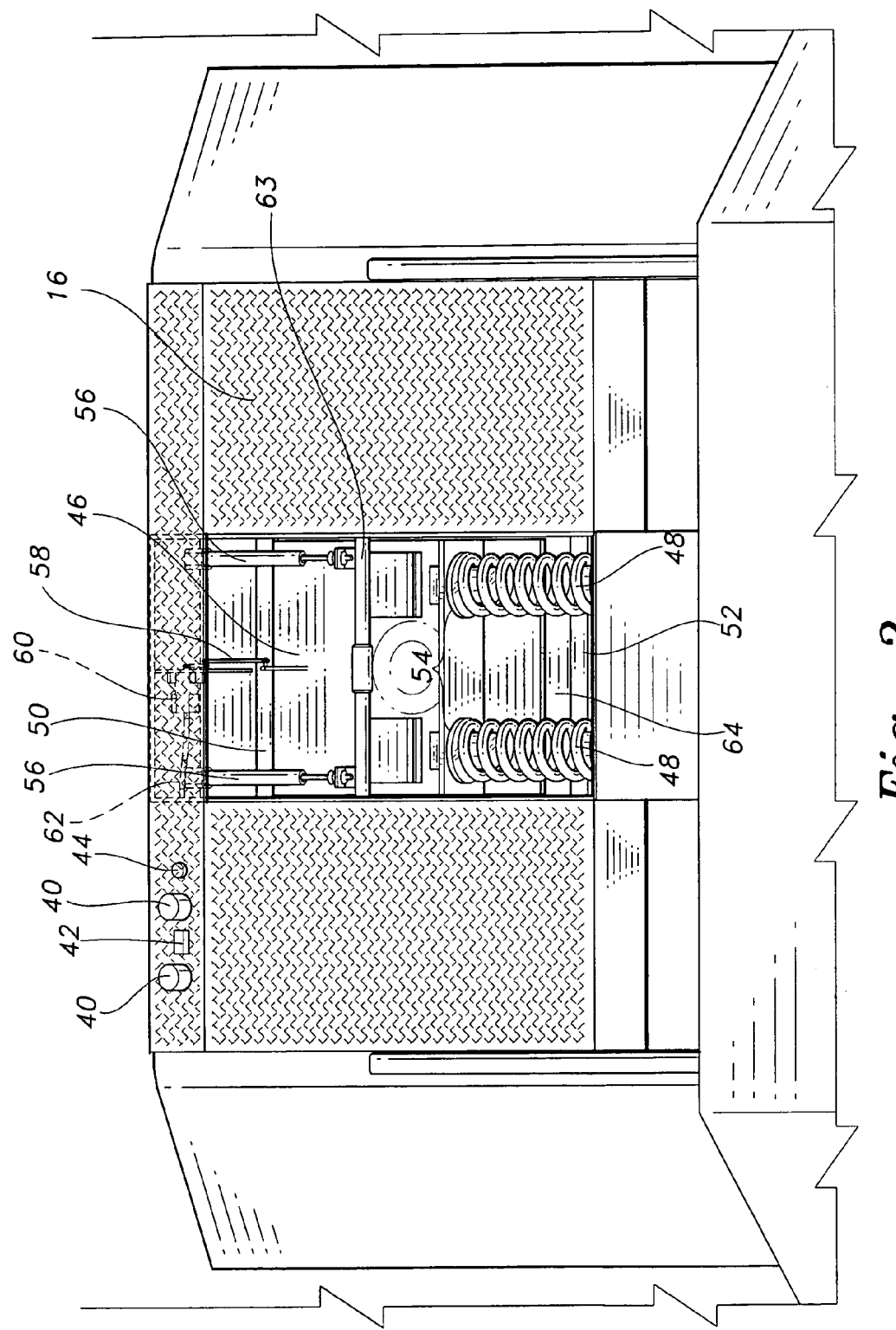
FIGS. 2 and 3 are elevational views of the forward deck of a trailer equipped with a self-contained brake and remote control system, according to the present invention.
Figure 3:
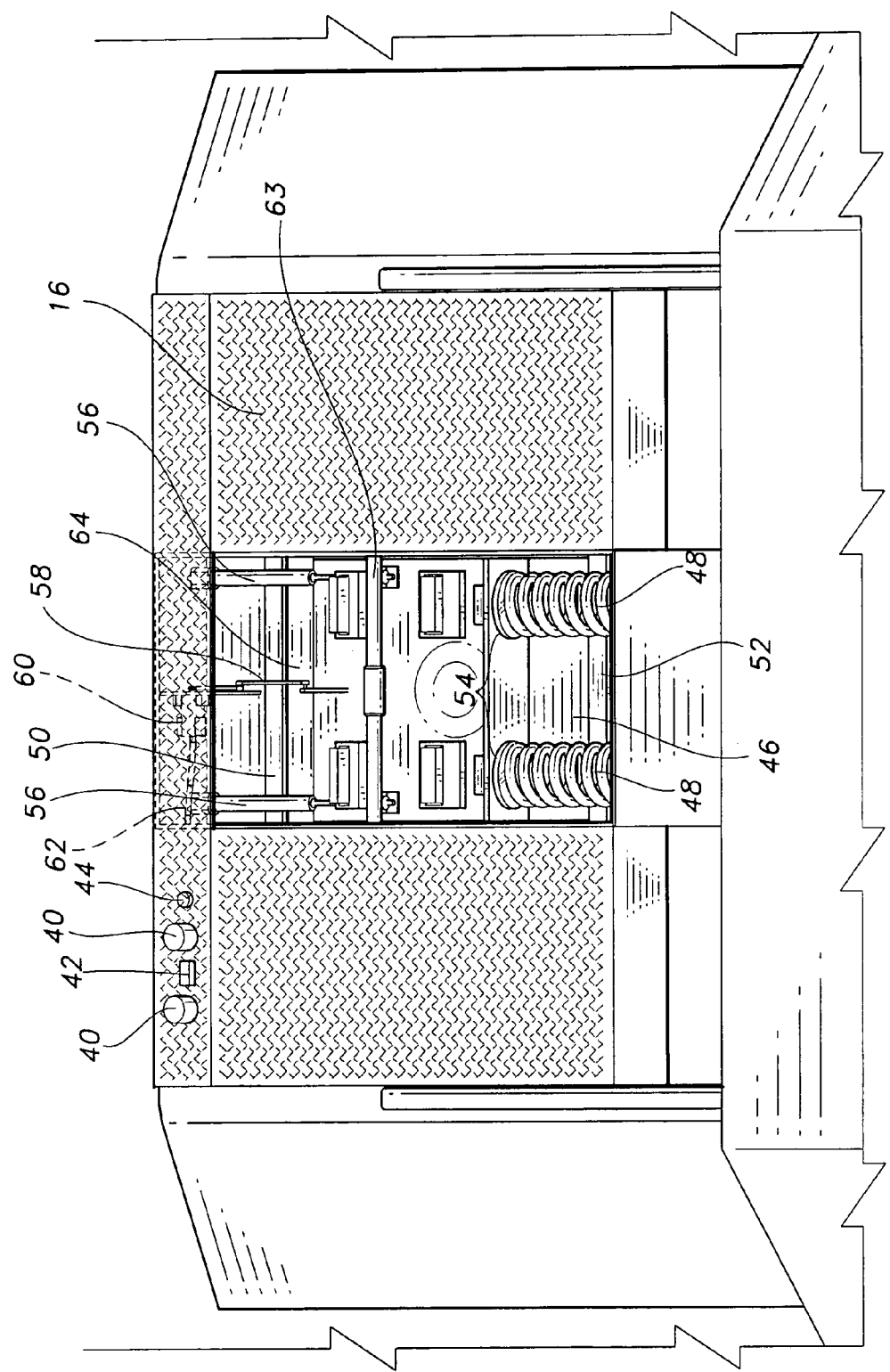

FIGS. 2 and 3 are elevational views of the forward deck of a trailer equipped with a self-contained brake and remote control system, according to the present invention. FIGS. 2 and 3 are downward views, looking forward from the top of the tank 14 onto the forward deck 16. FIG. 2 shows the operating mechanism for the self-contained brake system in the pulling or coasting position. FIG. 3 shows the operating mechanism for the self-contained brake system in the braking position.

The forward deck 16 is covered with plates, which are hinged to permit access to the self-contained brake system and other compartments. The deck 16 is shown with a pair of gladhands 40 and an electrical connector 42 for optional pneumatic and electric power from a towing vehicle. Also shown is a pneumatic isolator valve 44 that permits the user or operator to choose the source of power to operate the trailer's brakes, i.e., the towing vehicle or the power source on the trailer 10. In one position, the isolator 44 permits energy from the towing vehicle to operate the trailer's brakes. In another position, the isolator 44 permits energy from the power generator 70 (see FIG. 5) to operate the trailer's brakes. When using braking energy from the towing vehicle, the trailer's brakes function as standard Department of Transportation (DOT) required brakes. When delivery of the trailer to and from the job site is on the road, the trailer must use the DOT-approved brake system. However, the semi tractor is unnecessary at the off-road job site for the duration of the work at the job site.

The operating system for the self-contained brake system is situated within the frame 12 beneath the forward deck 16. A sliding plate 46 is the source of braking input to the self-contained brake system. The sliding plate 46 is capable of limited, generally horizontal movement between a forward stop 50 and a rear stop 52 and slides upon a floor plate 64. The contacting surfaces of the sliding plate 46 and the floor plate 64 may be coated with an anti-friction substance, such as Teflon®. In FIG. 2 the floor plate 64 is visible between the rear stop 52 and the sliding plate 46. In FIG. 3 the floor plate 64 is visible between the forward stop 50 and the sliding plate 46. A pair of springs 48 bear against the sliding plate 46 and apply force against sliding plate 46 toward the forward stop 50. In one embodiment, the springs 48 are coil springs. In other embodiments the springs 48 could be a torsion bar, leaf spring, or an air spring or airbag.

Notice in FIG. 3 the springs 48 are compressed. The springs 48 are held in position by a set of keepers 54. A set of dampers 56 moderates the action of the springs 48 in moving the sliding plate 46 against the forward stop 50. A linkage 58 connects the sliding plate 46 to a brake actuator 60. In one embodiment, the brake actuator 60 is supplied with pneumatic energy via an air hose 62. In another embodiment, the brake actuator 60 is supplied with electric power via a power cable. The particular embodiment used depends upon the type of energy required by the trailer's brakes. In FIG. 3 the linkage 58 is fully extended and the springs 48 are compressed, thus maximum braking energy is conducted through the actuator 60.

The self-contained brake system may be disabled with a brake lock mechanism 63. The brake lock 63 mechanically locks the sliding plate 46 to the frame 12, thus preventing any movement of the sliding plate 46 and subsequent trailer brake actuation. This is important where the trailer 10 is backing up an incline, and the trailer's own weight would actuate its brakes against the efforts of the towing vehicle. The brake lock 63 is also used where a standard DOT brake system is required.

Figure 4:
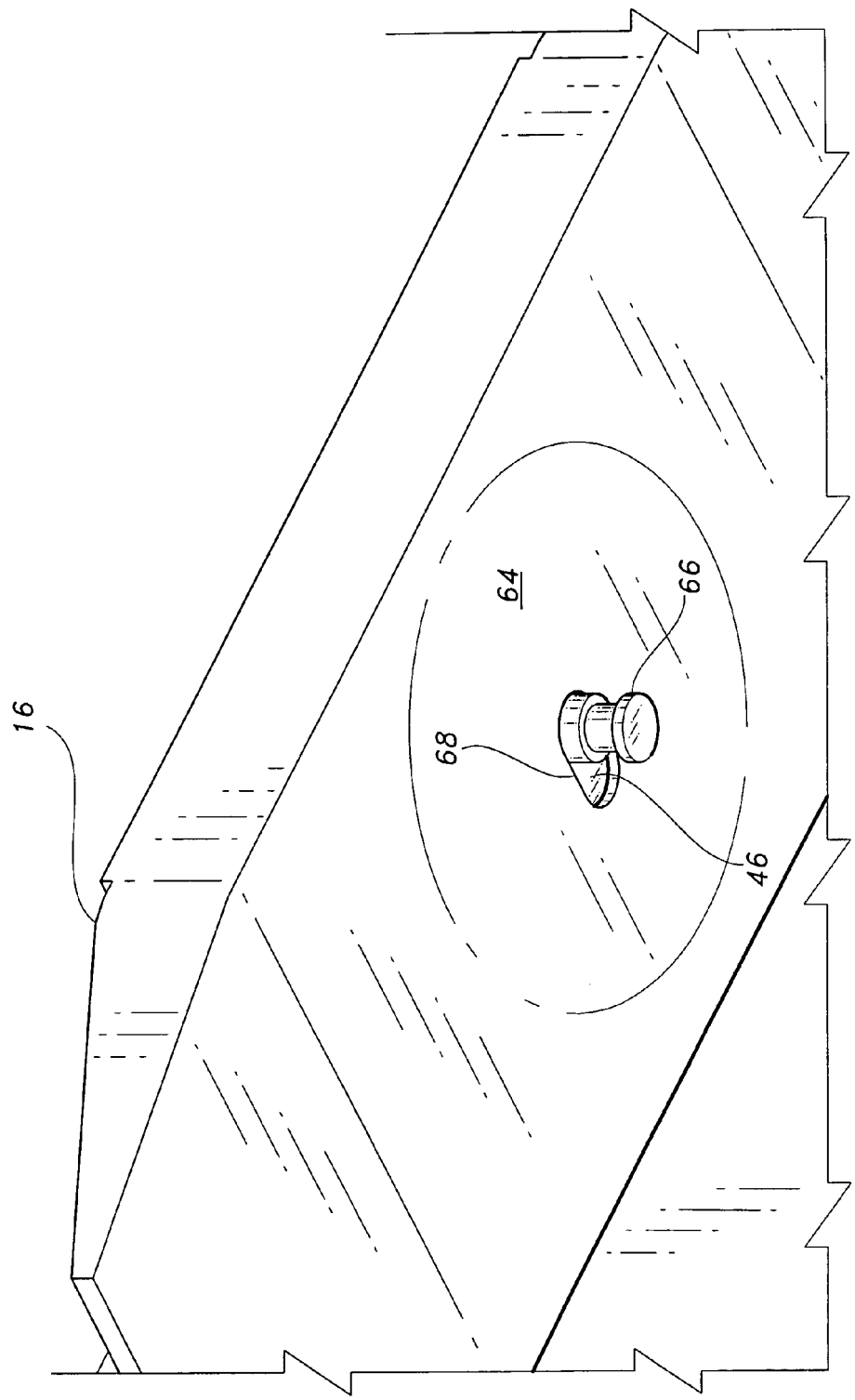
FIG. 4 is a view of the underside of the forward deck of a trailer equipped with a self-contained brake and remote control system, according to the present invention.

FIG. 4 is a perspective view of the underside of the forward deck of a trailer equipped with a self-contained brake and remote control system, according to the present invention. The under side of the floor plate 64 has an aperture 68 through which the kingpin 66 protrudes. The kingpin 46 is fixed to the bottom of the sliding plate 46 which is visible through the aperture 68. The aperture 68 is elongated along the longitudinal axis of the trailer 10. This permits the sliding plate 46 and the kingpin 66 to move forward and aft in response to dissimilar trailer and towing vehicle speeds. The total amount of movement of the kingpin 66 permitted by the aperture 68 matches the amount of available movement of the sliding plate 46 between the forward stop 50 and the rear stop 52. This arrangement limits the amount of stress experienced by the kingpin 66.

Returning to FIGS. 2 and 3, the brake actuator 60 acts as a valve to supply variable amounts of energy to the trailer's brakes depending upon the position of the sliding plate 46. When the sliding plate 46 is against the forward stop 50, the actuator 60 supplies no energy to the trailer's brakes. The sliding plate 46 will be in this position when the trailer 10 is being pulled forward by the towing vehicle. When the sliding plate 46 is against the rear stop 52, the actuator 60 supplies maximum energy to the trailer's brakes. The sliding plate 46 will be in this position when the towing vehicle is decelerating. Braking energy between these two extremes is supplied proportionally when the towing vehicle is braking at a rate which causes the sliding plate 46 to slide only part way between the forward stop 50 and the rear stop 52.

In use, the trailer 10 is attached to a towing vehicle. As the towing vehicle accelerates or coasts, the sliding plate 46 is against the forward stop 50 due to the pulling force of the towing vehicle upon the kingpin 66 and the sliding plate 46, or due to the action of the springs 48. When the towing vehicle decelerates, the inertia of the trailer 10 causes it to catch up to the towing vehicle and moving the sliding plate 46 and compressing the springs 48. As the sliding plate 46 moves, the linkage 58 operates the brake actuator 60 to supply braking energy to the trailer's brakes. The dampers 56 prevent excessive braking inputs particularly on uneven ground, where numerous undulations in the ground's surface would cause frequent acceleration and deceleration cycles.

Figure 5:
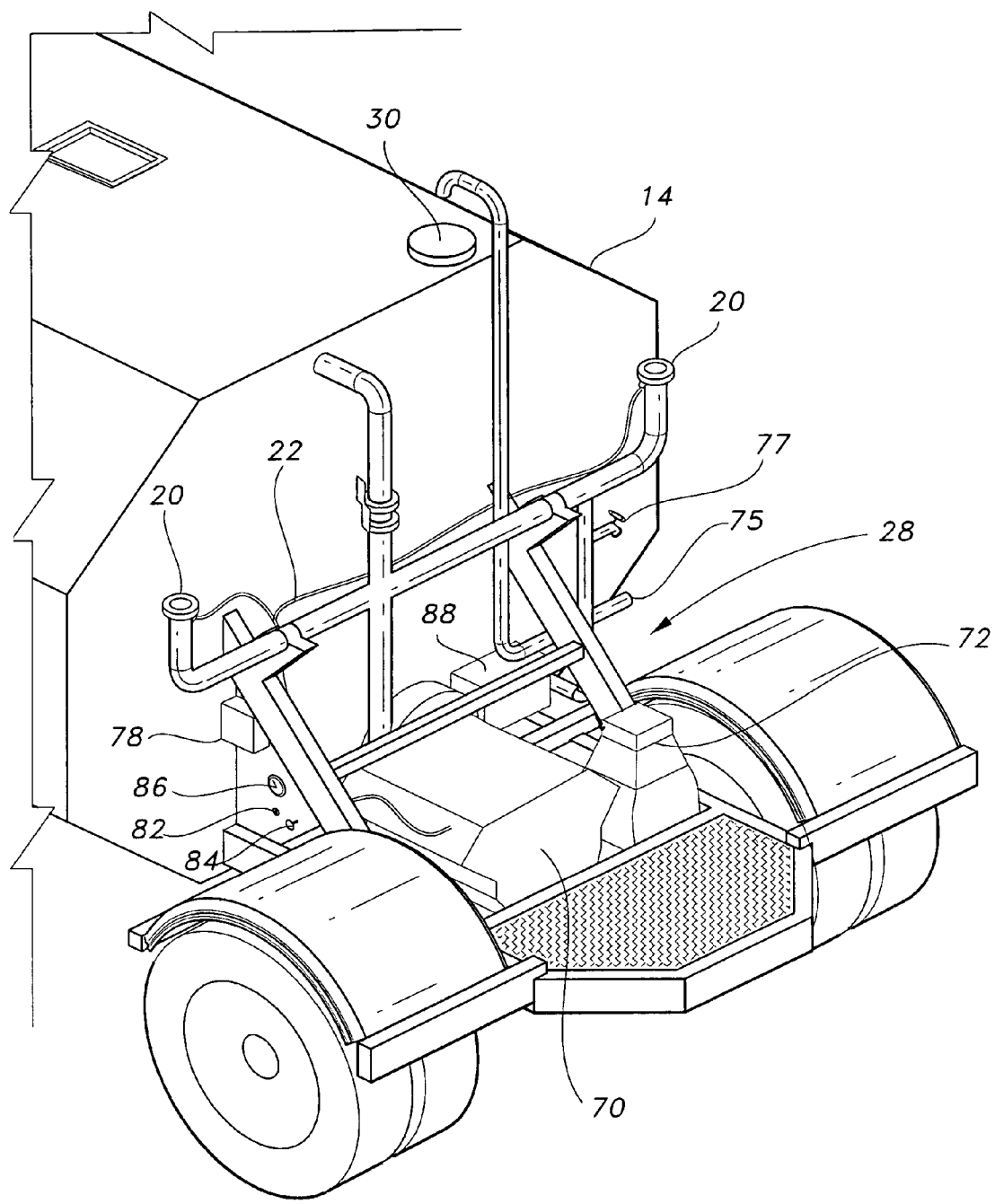
FIG. 5 is a perspective view of the rear of a trailer equipped with a self-contained brake and remote control system, according to the present invention.

FIG. 5 is a perspective view of the rear of a trailer equipped with a self-contained brake and remote control system, according to the present invention. The engine bay 28 houses a power generator 70. The power generator 70 supplies all of the pneumatic, electric or hydraulic power necessary to operate the trailer's brakes and all other functions. In the preferred embodiment, the power generator 70 is an internal combustion engine, but it could also be a reservoir of compressed air with batteries. The power generator includes an electric generator (not shown) and may also include an air pump 72 or hydraulic pump, depending upon the power requirements of the trailer 10, including the brakes. In the preferred embodiment, the power generator 70 is attached to an air pump 72 and a water pump 76. The air pump 72 supplies all of the pneumatic energy required, and the electric generator meets all the electric requirements. Virtually all of the electrical cables and pneumatic lines are routed through the tank 14 and frame 12 for maximum protection and cooling.

The water pump 76 has multiple uses. It permits the trailer 10 to fill itself with water from virtually any available water supply, including ground water. In addition, it supplies water pressure to the plumbing system of the trailer 10 for water delivery through the water couplings 20 or other water valves 74. The power generator 70 includes controls for manually starting and operating it, as well as a remote start and control capability through the remote operating system. A hydrant fill pipe 75 permits the tank 12 to be filled from any hydrant. This process does not require pumping due to the pressurized nature of hydrants. If the water supply is not pressurized, such as a ground water supply, then a self-load fill pipe (not shown) can be used. In this embodiment, the self-load fill pipe is located below the hydrant fill pipe 75. The self-load fill pipe is connected to the water pump on the power generator 70, and permits the trailer 10 to fill the tank 12 under its own power. A hose bib 77 or other hose coupling is provided for hose attachment.

The wireless remote operating system includes a remote control transmitter (not shown), a remote control receiver 78 and a power distribution unit 80 connected to the remote control receiver 78. The remote control transmitter may be kept with the operator in the cab of the towing vehicle. The power distribution unit 80 distributes electrical power to operate various functions of the trailer 10 as commanded by the remote control transmitter through the remote control receiver 78. The electrical power from the power distribution unit may in turn direct the operation of pneumatic- or hydraulic-powered features of the trailer 10, depending upon the construction of the trailer 10. For example, the electric power at the power distribution unit may trigger air valves within a pneumatic power system, or it may trigger hydraulic valves within a hydraulic system. Alternatively, the various functions of the trailer may all be electrically actuated and operated. There is no practical limit to the type and number of functions that could be actuated and operated in this manner.

Common powered functions include starting, stopping and adjusting the power output of the power generator 70, pumping water through the plumbing system to fill or empty the tank 14, and activation of a nozzle 26 or other equipment attached to a water coupling 20.

The wireless remote control transmitter provides control for every function of the trailer 10, including an emergency stop button, a generator start button, and accessory buttons to activate or deactivate the other powered functions of the trailer 10, and many other functions. Each function of the trailer 10 is operable separately from the others via the remote control transmitter. A battery 88 and a fuel tank (not shown) provide independent trailer 10 operation for extended periods. A control panel may provide a keyed starter 82 and choke control 84 for the power generator 70 as well as a set of gauges may be provided to monitor electric power, such as a voltmeter an ammeter 86, or other operating parameters.

In one embodiment, the trailer 10 includes all equipment required by Federal and state law for use on the road. The system permits the trailer 10 to be used by a wide variety of towing vehicles, even those that do not have proper over the road braking systems. A towing vehicle needs only a compatible hitch to properly attach and operate the self-contained trailer system. This trailer system greatly increases the flexibility of a fleet of trucks at an off road site. Numerous variations on this system are possible, including a trailer 10 with a completely conventional hitch frame, but where the towing vehicle's hitch is intended to slide or shift under a braking load to provide braking energy.

It is to be understood that the present invention is not limited to the sole embodiments described above, but encompasses any and all embodiments within the scope of the following claims.

I claim:

1. A self-contained trailer braking system comprising:
    a fifth wheel hitch attached to a trailer frame, where the trailer hitch further comprises a kingpin to engage a fifth wheel of a towing vehicle;
    a sliding mechanism attached to the kingpin, where the sliding mechanism is slidingly captured within the trailer frame and can move between a forward position and a rear position;
    a spring attached to the sliding mechanism and the trailer frame, where the spring biases the sliding member to the forward position;
    a brake actuator mounted to the trailer frame and linked to the sliding mechanism;
    a brake assembly attached to the brake actuator; and
    a power supply attached to the brake assembly, where power is applied to the brake assembly when the sliding mechanism is away from the forward position.

2. The self-contained trailer braking system of claim 1, wherein the power supply is an internal combustion engine.

3. The self-contained trailer braking system of claim 1, wherein the spring is a torsion bar.

4. The self-contained trailer braking system of claim 1, wherein the spring is a coil spring.

5. The self-contained trailer braking system of claim 1, wherein the spring is a pneumatic mechanism.

6. The self-contained trailer braking system of claim 1, wherein the spring is a leaf spring.

7. The self-contained trailer braking system of claim 1, wherein the sliding mechanism is immobilized with a lock mechanism.

8. The self-contained trailer braking system of claim 1, wherein the power supply furnishes pneumatic power.

9. The self-contained trailer braking system of claim 1, wherein the power supply furnishes electric power.

10. The self-contained trailer braking system of claim 1, wherein the power supply furnishes hydraulic power.

11. The self-contained trailer braking system of claim 1, further comprising:
    a damper attached to the sliding mechanism and the trailer frame, where the damper resists rapid movement of the sliding member.

12. A self-contained trailer braking system comprising:
    a fifth wheel hitch attached to a trailer frame, where the trailer hitch further comprises a kingpin to engage a fifth wheel of a towing vehicle;
    a sliding mechanism attached to the kingpin, where the sliding mechanism is slidingly captured within the trailer frame and can move between a forward position and a rear position;
    a coil spring attached to the sliding mechanism and the trailer frame, where the coil spring biases the sliding member to the forward position;
    a brake actuator mounted to the trailer frame and linked to the sliding mechanism;

a brake assembly attached to the brake actuator; and
a power generator attached to the brake assembly, wherein the power generator supplies pneumatic energy for the brake assembly, wherein power is applied to the brake assembly when the sliding mechanism is away from the forward position.

13. The self-contained trailer braking system of claim 12, further comprising:

a damper attached to the sliding mechanism and the trailer frame, where the damper resists rapid movement of the sliding member.

14. The self-contained trailer braking system of claim 12, wherein the sliding mechanism is deactivated with a lock mechanism.

* * * * *